United States Patent
Rodriguez et al.

(10) Patent No.: US 11,619,982 B2
(45) Date of Patent: Apr. 4, 2023

(54) EFFICIENT CALIBRATION OF CIRCUITS IN TILED INTEGRATED CIRCUITS

(71) Applicant: Advanced Micro Devices, Inc., Santa Clara, CA (US)

(72) Inventors: Miguel Rodriguez, Golden, CO (US); Stephen Victor Kosonocky, Fort Collins, CO (US); Peter T. Hardman, Loveland, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 277 days.

(21) Appl. No.: 17/134,952

(22) Filed: Dec. 28, 2020

(65) Prior Publication Data

US 2022/0206552 A1 Jun. 30, 2022

(51) Int. Cl.
*G06F 1/30* (2006.01)
*G05F 1/565* (2006.01)
*G06F 1/3203* (2019.01)

(52) U.S. Cl.
CPC .............. *G06F 1/305* (2013.01); *G05F 1/565* (2013.01); *G06F 1/3203* (2013.01)

(58) Field of Classification Search
CPC .......... G06F 1/305; G06F 1/3203; G06F 1/26; G05F 1/565
See application file for complete search history.

(56) References Cited

U.S. PATENT DOCUMENTS

| | | | |
|---|---|---|---|
| 9,946,278 B2 | 4/2018 | Rodriguez et al. | |
| 10,218,273 B2* | 2/2019 | Ergin | G05F 1/59 |
| 10,248,177 B2 | 4/2019 | Rodriguez et al. | |
| 2016/0342185 A1* | 11/2016 | Rodriguez | G06F 1/3243 |

* cited by examiner

*Primary Examiner* — Adolf D Berhane
*Assistant Examiner* — Afework S Demisse
(74) *Attorney, Agent, or Firm* — Polansky & Associates, P.L.L.C.; Paul J. Polansky

(57) ABSTRACT

An integrated circuit includes a plurality of tiles receiving a power supply voltage, each having a corresponding analog circuit and operates in response to a first voltage, and a hardware controller receiving a voltage identification code and provides the first voltage to each of the plurality of tiles in response thereto. The hardware controller comprises a test time controller determining coefficients of a waveform that describes an average correspondence between the power supply voltage and the first voltage for the plurality of tiles, and a boot time controller determining a respective error signal indicating an error between the waveform and a respective actual waveform for each of the plurality of tiles, and providing the respective error signal to the corresponding analog circuit of each of the plurality of tiles. The corresponding analog circuit of each of the plurality of tiles adjusts the first voltage according to the respective error signal.

20 Claims, 7 Drawing Sheets

EFFICIENT CALIBRATION OF CIRCUITS IN TILED INTEGRATED CIRCUITS

BACKGROUND

Certain integrated circuits can be formed with uniform circuits known as tiles that implement the same circuit function. For example, a graphics processing unit (GPU) typically includes a set of tiles each performing the same graphics processing operation on portions of a large data set in parallel. For example, each core circuit can perform shading on a different portion of a frame stored in a frame buffer in parallel. Each core has a voltage regulator that provides its own local adjusted supply voltage. The voltage regulator in each tile has a low dropout architecture to allow independent regulation in each tile based on the needs of the tile. For example, the local power supply voltage of a tile performing a processing-intensive operation may tend to fall or "droop", whereas the local power supply voltage of an idle tile will not.

The voltage regulator in each tile is typically implemented as a low dropout (LDO) regulator in which the local power supply voltage is compared to a reference voltage using an analog comparator. When the voltage droops, i.e. when the comparator senses that the local power supply voltage has fallen below the reference voltage, the LDO regulator can increase the conductivity of a pass transistor to increase the power supply voltage. In a design using a composite pass transistor formed in segments of transistors connected in parallel, the same type of operation would entail activating more transistor segments to lower the conductivity of the composite pass transistor. In either case, the local voltage regulation function is dependent on the accuracy of the comparator.

In modern complementary metal-oxide-semiconductor (CMOS) technology used in most highly integrated GPUs, analog comparators are susceptible to voltage offsets. The typical solution to the offsets introduced by analog CMOS comparators is to calibrate the comparator and adjust for each comparator's particular offset. However, there are significant problems with using this approach in integrated circuits with large numbers of tiles. If the offsets are calculated when the integrated circuit is started, the calibrations are cumbersome and very time consuming, since the operating system takes a large amount of time to perform the offset measurement and offset calibration, resulting in poor user experience. The problem is compounded in integrated circuits with large numbers of tiles, e.g. 96 tiles or more, because an already-slow process can severely impact user experience at startup.

Figure 1:
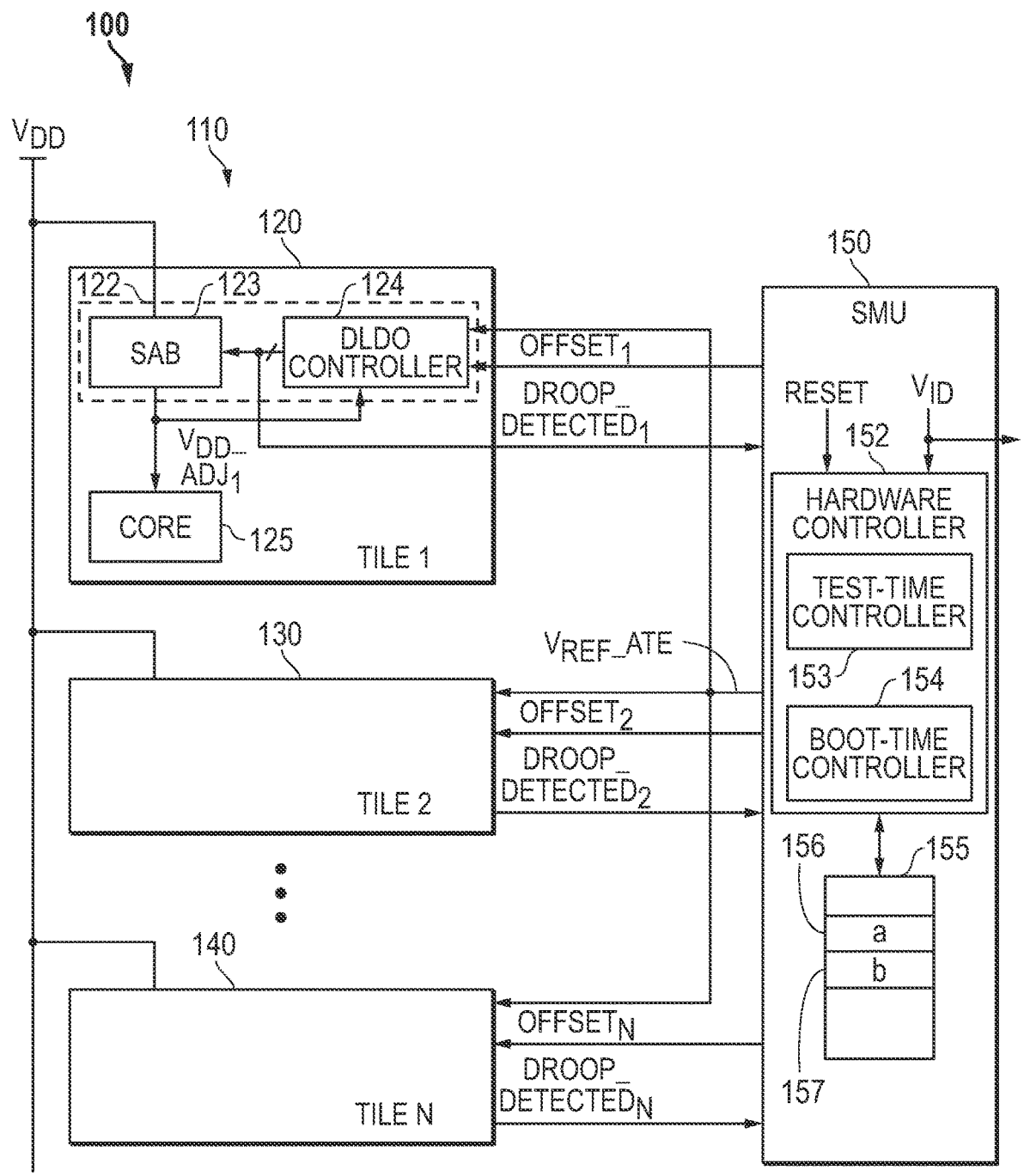
FIG. 1 illustrates in block diagram form an integrated circuit with an efficient calibration technique of distributed comparators according to some embodiments.

In the following description, the use of the same reference numbers in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below, in one for, an integrated circuit includes a plurality of tiles and a hardware controller. The plurality of tiles receives a power supply voltage, and each of the plurality of tiles has a corresponding analog circuit and operates in response to a first voltage. The hardware controller receives a voltage identification code and provides the first voltage to each of the plurality of tiles in response thereto. The hardware controller comprises a test time controller and a boot time controller. The test time controller that determines coefficients of a waveform that describes an average correspondence between the power supply voltage and the first voltage for the plurality of tiles. The boot time controller determines a respective error signal indicating an error between the waveform and a respective actual waveform for each of the plurality of tiles, and provides the respective error signal to the corresponding analog circuit of each of the plurality of tiles. The corresponding analog circuit of each of the plurality of tiles adjusts the first voltage according to the respective error signal.

In another form, an integrated circuit includes a plurality of tiles and a system management unit. The plurality of tiles receives a power supply voltage. Each tile has a corresponding analog circuit and operates in response to a first voltage. The system management unit is coupled to each of the plurality of tiles. The system management unit has a hardware controller that provides the first voltage to each of the plurality of tiles in response to a voltage identification code, determines coefficients of a waveform that describes an average correspondence between the power supply voltage and the first voltage for the plurality of tiles, determines a respective error signal indicating an error between the waveform and a respective actual waveform for each of the plurality of tiles, and provides the respective error signal to the corresponding analog circuit of each of the plurality of tiles. The corresponding analog circuit of each of the plurality of tiles adjusts the first voltage according to the respective error signal.

In yet another form, a method for calibrating an integrated circuit having a plurality of tiles each including an analog circuit and operating using a power supply voltage and a first voltage includes determining coefficients of a waveform that describes an average correspondence between the power supply voltage and the first voltage for the plurality of tiles using a hardware controller. A respective error signal indicating an error between the waveform and a respective actual waveform for each of the plurality of tiles using the hardware controller is determined. The respective error signal is provided to the analog circuit of each of the plurality of tiles (110). The power supply voltage is set in response to a voltage identification code using the hardware controller. The first voltage is provided to each of the plurality of tiles in response to the voltage identification code and the waveform using the hardware controller. The first voltage is adjusted in each of the plurality of tiles according to the respective error signal.

FIG. 1 illustrates in block diagram form an integrated circuit 100 with an efficient calibration technique of distributed comparators according to some embodiments. Integrated circuit 100 is a tiled data processor including a set of tiles 110 and a system management unit 150 labelled "SMU".

As shown in FIG. 1, set of tiles 110 includes representative tiles including a tile 120 labelled "TILE 1", a tile 130 labelled "TILE 2", and a tile 140 labelled "TILE N". In integrated circuit 100, each tile is constructed the same and includes a voltage regulator 122 and a core circuit 125. Voltage regulator 122 includes a supply adjustment block 123 and a digital low dropout controller 124. Supply adjustment block 123 has a power supply input for receiving a power supply voltage labelled "$V_{DD}$", a power supply output for providing a power supply voltage labelled "$V_{DD}$_ADJ$_1$", and a control input for receiving a signal labelled "DROOP_DETECTED$_1$". DLDO controller 124 has a first input connected to the power supply output of supply adjustment block 123 for receiving the $V_{DD}$_ADJ$_1$ signal therefrom, a second input for receiving a signal labelled "$V_{REF}$_ATE", a third input for receiving a signal labelled "OFFSET$_1$", and an output connected to the control input of supply adjustment block 123 for providing the DROOP_DETECTED$_1$ signal thereto. Core 125 has a power supply input connected to the output of supply adjustment block 123 for receiving the $V_{DD}$_ADJ$_1$ signal therefrom. Tiles 130 and 140 are constructed similarly to tile 120, except as follows. Tiles 130 and 140 both receive the VREF_ATE signal. Tile 130 receives a signal labelled "OFFSET$_2$" and provides a signal labelled "DROOP_DETECTED$_2$", whereas tile 140 receives a signal labelled "OFFSET$_N$" and provides a signal labelled "DROOP_DETECTED$_N$".

System management unit 150 includes a hardware controller 152 and a memory 155. Hardware controller 152 has an input for receiving a reset signal labelled "RESET", and an input for receiving a voltage identification signal labelled "VID", and a bidirectional memory interface. Hardware controller 152 includes generally a test time controller 153 and a boot time controller 154, whose constitution and operation will be described in greater detail below. Memory 155 is a local memory for use by hardware controller 152 and includes a memory location 156 for storing a quantity labelled "a", and a memory location 157 for storing a quantity labelled "b".

In an exemplary embodiment, integrated circuit 100 is a graphics processing unit (GPU) including a set of GPU cores that perform the same graphics processing operation on portions of a large data set in parallel. For example, each core circuit such as core circuit 125 can perform shading on a different portion of a frame stored in a frame buffer in parallel. Each core has a voltage regulator that provides its own local adjusted supply voltage. The voltage regulator in each tile has a low dropout architecture in which supply adjustment block 123 is a set of pass transistors connected in parallel.

In the illustrated embodiment, digital low dropout controller 124 operates using two regulation loops. The first regulation loop is based on a global voltage setting that may be determined based on a processor power state (P-state) that varies with the speed of operation and is set based on the level of activity of the currently-executing application programs. In addition, each voltage regulator has a second regulation loop that detects droops in the power supply voltage in its particular tile and corrects the droop quickly. Thus while each local power supply voltage $V_{DD}$_ADJ is isolated from each other one, digital low dropout controller 124 adjusts the conductivity of pass transistors in supply adjustment block 123 to compensate for droops below the desired voltage level.

In general, an LDO regulator includes a pass transistor (implemented in each tile in integrated circuit 100 as a supply adjustment block with multiple transistors in parallel that can be digitally selected) and a controller that adjusts the conductivity of the composite pass transistor by making different numbers of transistors in supply adjustment block 123 conductive. As in most LDO designs, the controller uses an analog comparator to compare the difference between the actual voltage and the desired voltage to adjust the conductivity of supply adjustment block 123. An analog comparator implemented in CMOS technology is susceptible to errors such as gain errors and offset errors. These errors would be difficult to detect and correct for each tile of an integrated circuit having a large number of tiles, such as hundreds or thousands that might be used in a high-performance GPU.

The inventors have discovered, however, that by using hardware controllers and breaking the hardware controllers into test time controller 153 and boot time controller 154, the calibration of all the individual offsets can be achieved with only a small amount of time at boot up and with only a small increase in circuit area and a small number of fuses.

Figure 2:
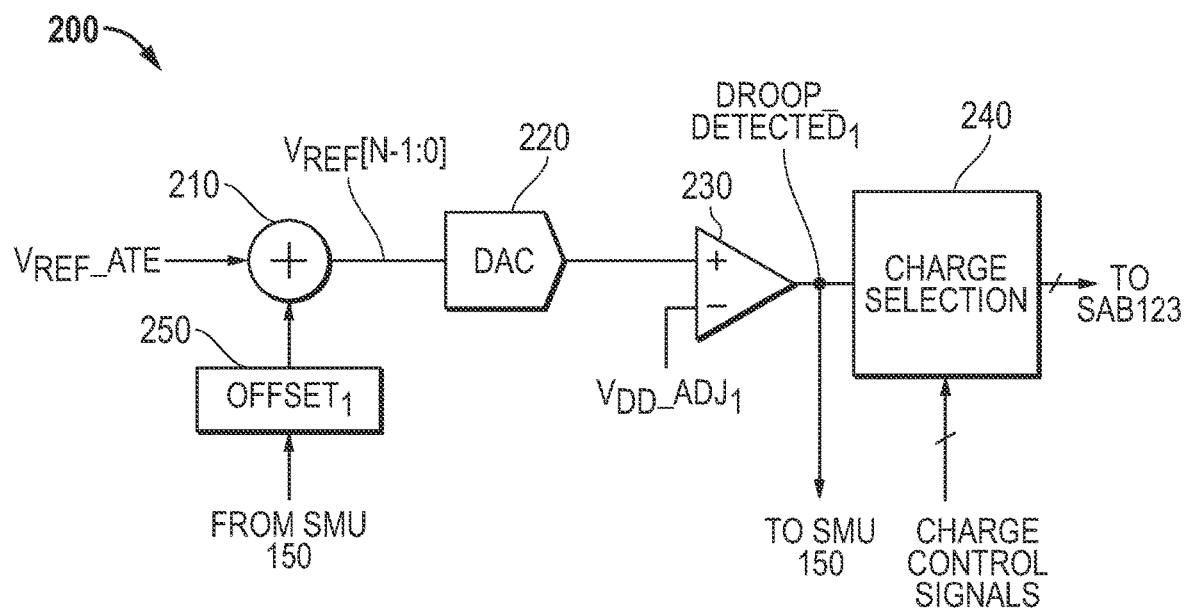
FIG. 2 illustrates in block diagram form a fast droop detector that can be used in the digital low dropout controller of FIG. 1 according to some embodiments.

FIG. 2 illustrates in block diagram form a fast droop detector 200 that can be used in digital low dropout controller 124 of FIG. 1 according to some embodiments. Fast droop detector 200 includes a summing device 210, a digital-to-analog converter 220, a comparator 230, a charge selection circuit 240, and a register 250. Summing device 210 has a first input for receiving the $V_{REF}$_ATE signal, a second input for receiving the OFFSET$_1$ signal, and an output for providing a value labelled "$V_{REF}$[N−1:0]". Digital-to-analog converter 220 has an input connected to the output of summing device 210, and an output. Comparator 230 has a positive input connected to the output of digital-to-analog converter 22, a second input for receiving VDD_ADJ1, and an output for providing the DROOP_DETECTED$_1$ signal. Charge selection block 240 has a first input connected to the output of comparator 230, a second input for receiving a set of control signals labelled "CHARGE CONTROL SIGNALS", and an output for providing a set of selection signals to supply adjustment block 123. Register 250 has an input connected to system management unit 150 for receiving the OFFSET$_1$ signal, and an output connected to the second input of summing device 210.

Fast droop detector 200 is part of digital low dropout controller 124 of FIG. 1, but also performs fast droop detection and correction for droops that may occur in the VDD_ADJ in its own tile. Specifically adjusts the conductive states of transistors in supply adjustment block 123 to regulate $V_{DD\_}ADJ_1$ to a desired level based not only on the desired value of $V_{DD}$ set by system management unit 150, but also based on local droop in $V_{DD\_}ADJ$ caused by specific processing activity taking place in its associated core. $V_{REF\_}ATE$ represents the value of $V_{REF}$ that, on average, causes all the voltage regulators in integrated circuit 100 to set their respective $V_{DD\_}ADJ$ values to be equal to the desired voltage. Hardware controller 152 uses test time controller 153 to calibrate $V_{DD\_}ATE$ at test-time, i.e. a one-time operation at factory test. Test time controller 153, which may also work in conjunction with a test program running on a VLSI tester, and programs fuses in memory locations 156 and 157 with coefficients a and b, respectively, of a linear equation that relates $V_{REF}$ to $V_{DD}$ according to the following relationship:

$$V_{DD} = a \times V_{REF\_}ATE + b \quad [1]$$

Using algebraic manipulation, Equation [1] can be rewritten to express $V_{REF\_}ATE$ as a linear function of a desired value of $V_{DD}$:

$$V_{REF\_}ATE = c \times V_{DD} + d \quad [2]$$

To regulate $V_{DD}$ to a desired level in a tiled integrated circuit, hardware controller 152 sets $V_{REF\_}ATE$ to a level that, on average, causes $V_{DD\_}ADJ$ in each tile to be equal to the desired level of $V_{DD}$.

As noted above, CMOS circuits are susceptible to offsets, and there are considerable variations between these relationships in any given voltage regulator. The offsets can be caused either by offsets in comparator 230, and by offsets caused by digital-to-analog converter 220. As will be explained in greater detail below, unlike known designs, integrated circuit 100 leverages the existence of comparator 230 to allow system management unit 150 to easily and efficiently calculate the individual offsets even when the integrated circuit contains a large number of processor tiles.

Summing device 210 adds the offset stored in register 250, i.e. $OFFSET_1$, to $V_{REF\_}ATE$ to form $V_{REF}[N-1:0]$. The $OFFSET_1$ signal is number which can be either positive or negative and represents the deviation of the offset error of comparator 230 and digital-to-analog converter 220 from the average deviation of all the tiles in integrated circuit 100.

Figure 3:
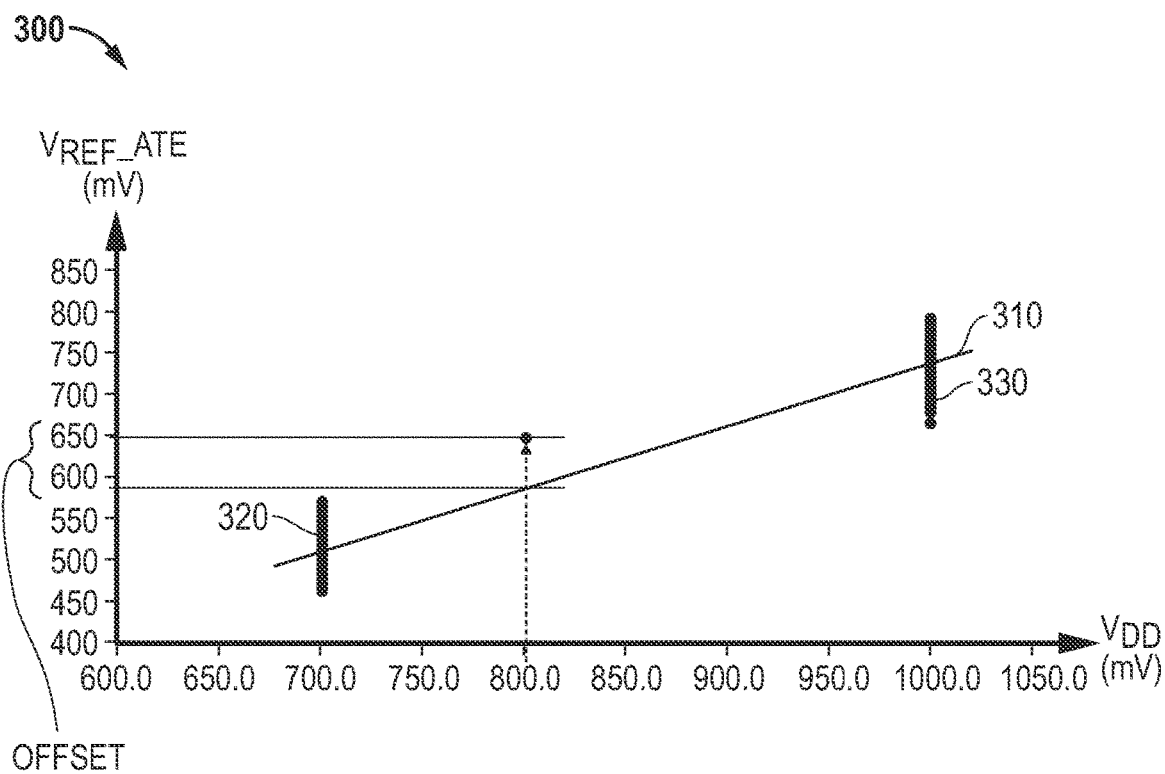
FIG. 3 illustrates a graph showing the correlation between power supply voltage and comparator reference voltage of the digital low dropout regulator of FIG. 1.

FIG. 3 illustrates a graph 300 showing the correlation between power supply voltage and comparator reference voltage of the digital low dropout regulator of FIG. 1. In graph 300, the horizontal axis represents power supply voltage $V_{DD}$ in millivolts (mV), and the vertical axis represents $V_{REF\_}ATE$ in mV. Graph 300 shows a line 310 of the average linear relationship between $V_{REF\_}ATE$ and $V_{DD\_}ADJ$ in all of the processor tiles, as well as a line segment 320 showing a range of variability of $V_{REF\_}ATE$ among processor tiles at a low voltage labelled "$V_{DD1}$", and a line segment 330 showing a range of variability of $V_{REF\_}ATE$ among processor tiles at a high voltage labelled "$V_{DD2}$", in which $V_{DD1}$ and $V_{DD2}$ are within the range of supported power supply voltages.

The inventors observed that in a contemporary state-of-the art manufacturing processes, while there is considerable offset error of CMOS comparators (and analog-to-digital converters) across integrated circuit 100, the gain error tends to be much smaller than the offset error and it small enough that it can be neglected. Thus a tile showing a high offset compared to the average at $V_{DD1}$ will tend to have about the same high offset at $V_{DD2}$ and at every point in between. In the example shown in FIG. 3, $V_{DD1}$ is 700 mV and $V_{DD2}$ is 1000 mV. If a particular tile has an offset of about 60 mV at a power supply voltage of 700 mV, it will have about the same 60 mV offset at an intermediate power supply voltage labelled "Vx" of 800 mV and at 1000 mV.

At test time, test time controller 153 determines the average $V_{REF\_}ATE$ of all tiles at $V_{DD1}$ and at $V_{DD2}$. These two points are sufficient to derive the equation for line 310. Test time controller 153 determines coefficients a and b defining line 310 and stores them (alone or with the help of a VLSI tester) in memory 155.

At boot time, boot time controller 154 determines the offsets of each of the tiles and sends the values to the respective digital low dropout controllers. As will be explained below, boot time controller 154 is able to calibrate all of the offsets in parallel without software intervention and therefore completes the calibration quickly. Thus integrated circuit 100 maintains fast startup time by avoiding the need for extensive firmware intervention to perform the calibration.

Figure 4:
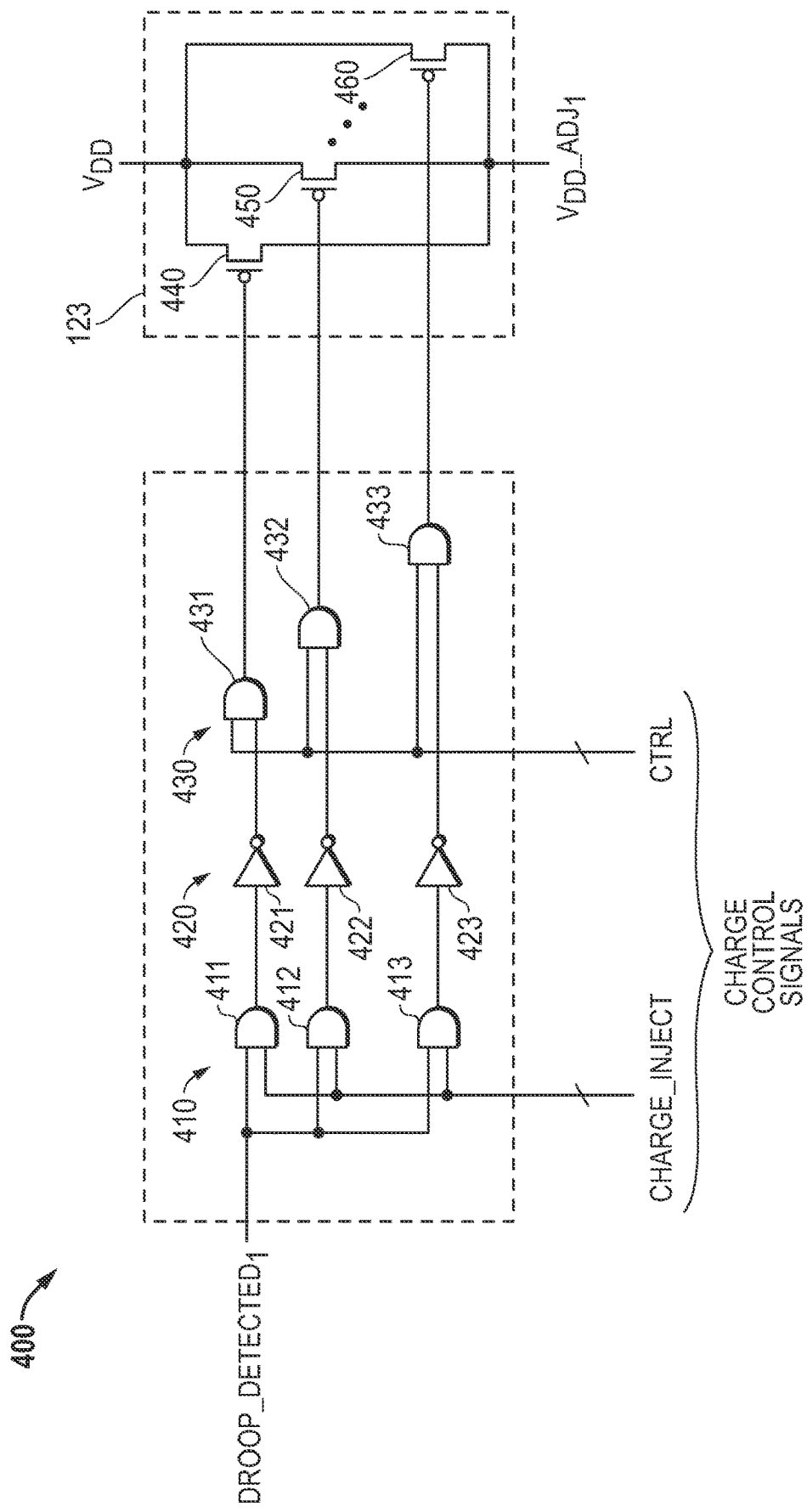
FIG. 4 illustrates in partial block diagram and partial schematic form a portion of the voltage regulator of FIG. 2 according to some embodiments.

FIG. 4 illustrates in partial block diagram and partial schematic form a portion 400 of the voltage regulator of FIG. 2 according to some embodiments. Portion 400 is useful in understanding the operation of the two control loops. Portion 400 includes charge selection circuit 240 of FIG. 2 and supply adjustment block 123 of FIG. 1. Charge selection circuit 240 generally includes a set of AND gates 410, a set of inverters 420, and a set of AND gates 430.

AND gates 410 include three representative AND gates including an AND gate 411, an AND gate 412, and an AND gate 413. AND gate 411 has a first input for receiving the $DROOP\_DETECTED_1$ signal, a second input for receiving a first bit of a multibit signal labelled "CHARGE INJECT" and an output. AND gate 412 has a first input for receiving the $DROOP\_DETECTED_1$ signal, a second input for receiving a second bit of the CHARGE INJECT signal, and an output. AND gate 413 has a first input for receiving the $DROOP\_DETECTED_1$ signal, a second input for receiving an $n^{th}$ bit of the CHARGE INJECT signal, and an output.

Inverters 420 include three representative inverters including an inverter gate 421, an inverter 422, and an inverter 423. Inverter 421 has an input connected to the output of AND gate 411, and an output. Inverter 422 has an input connected to the output of AND gate 412, and an output. Inverter 423 has an input connected to the output of AND gate 413, and an output.

AND gates 430 include three representative AND gates including an AND gate 431, an AND gate 432, and an AND gate 433. AND gate 431 has a first input for receiving a signal labeled "CTRL", a second input connected to the output of inverter 421, and an output. AND gate 432 has a first input for receiving the CTRL signal, a second input connected to the output of inverter 422, and an output. AND gate 431 has a first input for receiving the CTRL signal, a second input connected to the output of inverter 423, and an output.

Supply adjustment block 123 includes transistors 440, 450, and 460. Transistor 440 is a P-channel MOS transistor having a source for receiving $V_{DD}$, a gate connected to the output of AND gate 431, and a drain for providing signal $V_{DD\_}ADJ_1$. Transistor 450 is a P-channel MOS transistor having a source for receiving $V_{DD}$, a gate connected to the output of AND gate 431, and a drain connected to the drain of transistor 440. Transistor 440 is a P-channel MOS transistor having a source for receiving $V_{DD}$, a gate connected to the output of AND gate 431, and a drain connected to the drains of transistors 440 and 450.

Figure 5:
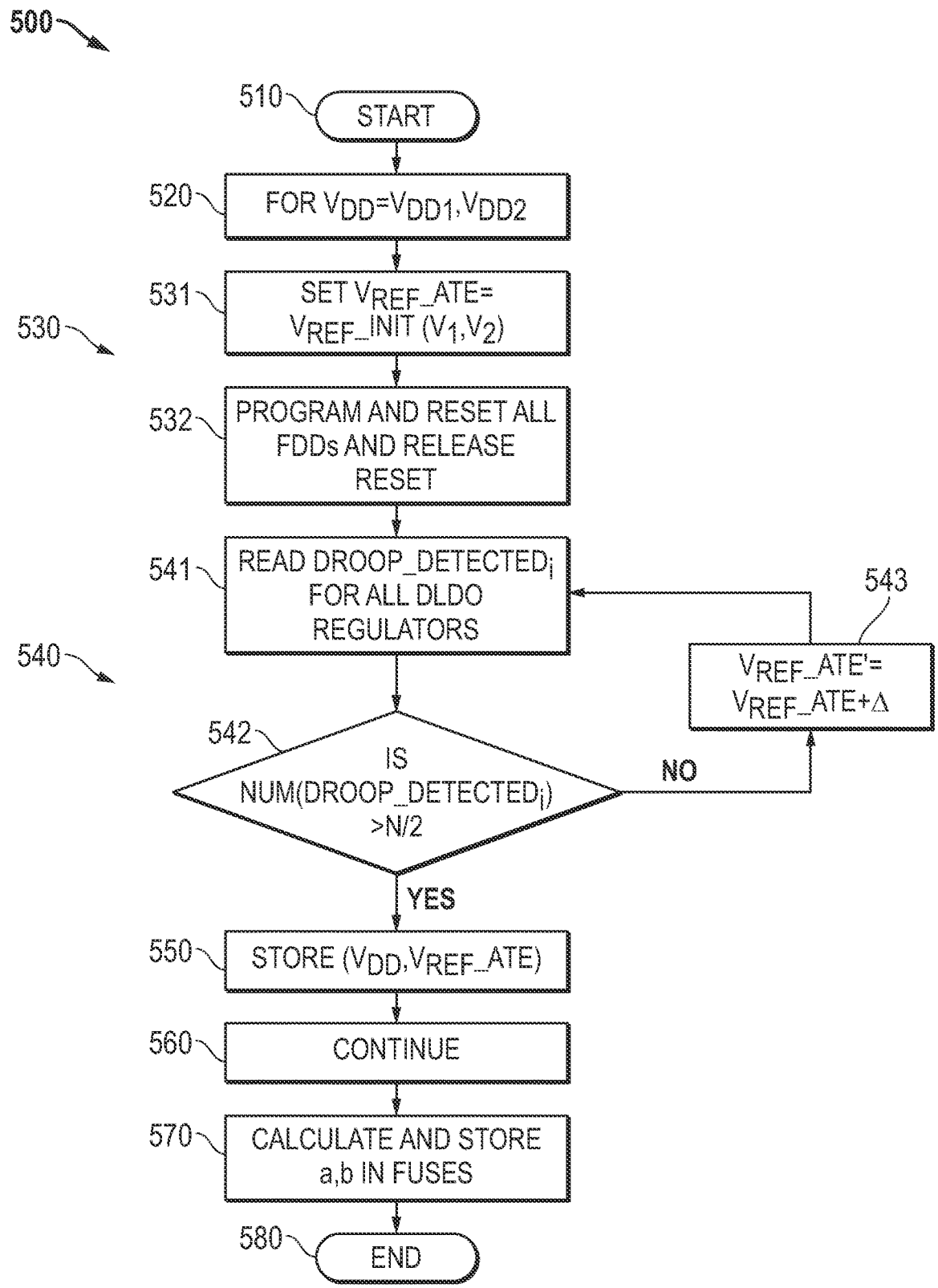
FIG. 5 illustrates a flow chart of a test time method implemented by the hardware controller of FIG. 1 according to some embodiments.

Signals CTRL and CHARGE INJECT are multi-bit digital signals that together correspond to the CHARGE CONTROL SIGNALS shown in FIG. 2. The CTRL signals are used in the main control loop to regulate VDD_ADJ1 as part of the main control loop. System management unit 150 operates as the controller of the first loop to regulate the set the average of the VDD_ADJ signals to equal the voltage identified by the VID signals. Thus if the average voltage is less than VID, system management unit 150 activates more transistors in supply adjustment block 123. Since the transistors are P-channel transistors that are activated in response to a low voltage, the CTRL signals are active low sand an active low voltage forces the output of the respective AND gates to a low voltage regardless of the voltage of the other input.

according to a different between a voltage identified by the VID signals and an average of all the $V_{DD\_}ADJj$ signals FIG. 5 illustrates a flow chart 500 of a test time method implemented by hardware controller 152 of FIG. 1 according to some embodiments. Flow starts at box 510. Box 520 identifies two passes of certain succeeding action boxes and a decision box that will be performed for each of $V_{DD1}$ and $V_{DD2}$.

A sub-flow 530 relates to pre-processing steps and includes action boxes 531 and 532. In action box 531, $V_{REF\_}ATE$ is set to an initial value labelled "$V_{REF\_}INIT$" for each of $V_{DD1}$ and $V_{DD2}$, in which $V_{REF\_}INIT$ may vary between the $V_{DD1}$ and $V_{DD2}$ passes of the flow. In action box 532, system management unit 150 programs and then releases all DLDO regulators and then releases the reset.

A sub-flow 540 varies VREF_ATE to determine the range of offsets and includes an action box 541, a decision box 542, and an action box 543. In action box 541, test time controller 153 reads DROOP_DETECTED$_i$ for all digital low dropout regulators. The reading provides a vector of comparators which detect that $V_{REF\_}ATE$ is greater than $V_{DD\_}ADJ_i$. In action box 542, test time controller detects whether the number of DROOP_DETECTED$_1$ signals is greater than half of the number of tiles N. If not, then flow continues to action box 543 in which a next value of $V_{REF\_}ATE$, designated "$V_{REF\_}ATE'$", is obtained by adding a step size Δ to the current value of $V_{REF\_}ATE$. The loop of action box 541, decision box 542, and action box 543 repeats until the number of DROOP_DETECTEDi signals is greater than half of the number of tiles N. If so, then the flow continues to actin box 550, which stores the data point defined by the selected one of $V_{DD1}$ and $V_{DD2}$ and the value of $V_{REF\_}ATE$ when the half threshold is crossed is stored in volatile memory. Action box 560 indicates that the previous flow is continued and repeated for both $V_{DD1}$ and $V_{DD2}$. Then once this flow has been completed for both $V_{DD1}$ and $V_{DD2}$, values of a and b can be calculated and stored in fuses 156 and 157, respectively. In various embodiments, action box 570 can be performed by test time controller 153, by another data processor in system management unit 150, or by the VLSI tester.

After test time, system management unit uses the equation defined by coefficients a and b to calculate the value of $V_{REF\_}ATE$ for a given value of VID. Since VID may change during operation, the formula produces the value of $V_{REF\_}ATE$ in which will cause the digital low dropout regulator in each tile to provide an adjusted value of $V_{DD}$ that is approximately equal to the desired $V_{DD}$.

An exemplary embodiment of a hardware controller suitable for use as test time controller 153 or FIG. 1 will now be described.

Figure 6:
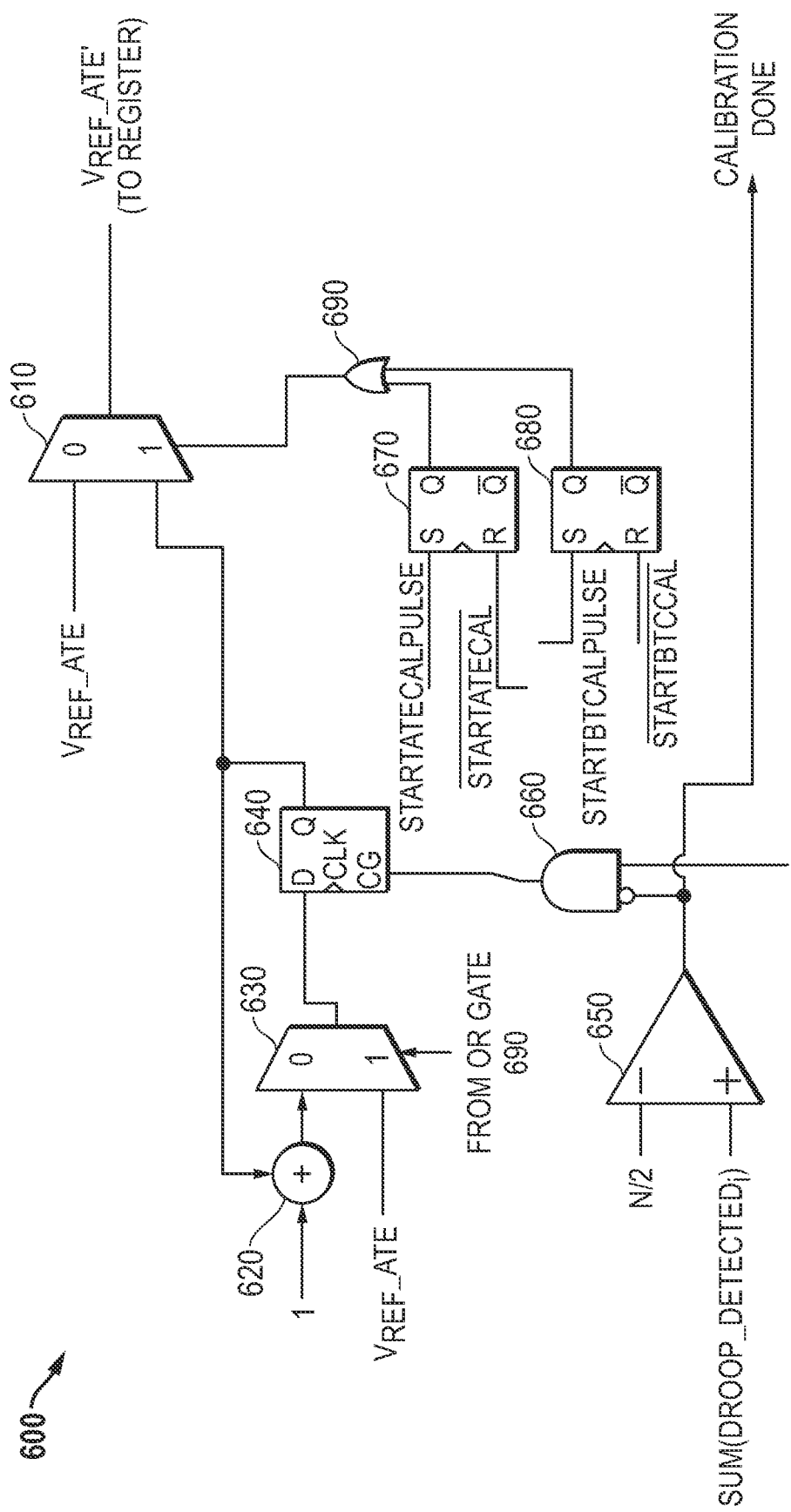
FIG. 6 illustrates in block diagram form a test time controller circuit that implements the method of FIG. 5 according to some embodiments.

FIG. 6 illustrates in block diagram form a test time controller 600 that implements the method of FIG. 5 according to some embodiments. Test time controller 600 is a hardware circuit and includes a multiplexer 610, a summing device 620, a multiplexer 630, a register 640, a comparator 650, an AND gate 660, a flip-flop 670, a flip-flop 680, and an OR gate 690.

Multiplexer 610 as a first or "0" input for receiving $V_{REF\_}ATE$, a second or "1" input, a control input, and an output for providing a next value of $V_{REF\_}ATE$ labelled "$V_{REF\_}ATE'$" for storage in a register (not shown). Summing device 620 has a first input for receiving a unit value labelled "1", a second input, and an output. Multiplexer 630 has a first input connected to the output of summing device 620, a second input for receiving $V_{REF\_}ATE$, a control input, and an output. Register 640 is a multi-bit register represented pictorially in FIG. 6 as a D-type flip-flop representative of each bit in register 640 and having a D input connected to the output of multiplexer 630, a clock input for receiving a clock signal (not shown), a clock gate input labelled "CG", and a Q output. Comparator 650 is a multi-bit digital comparator having a negative input for receiving the value "N/2", in which N is the number of tiles, a positive input for receiving a value labeled "SUM(DROOP_DETECTED$_i$)", and an output for providing a signal labelled "CALIBRATION DONE". AND gate 750 has an inverting input connected to the output of comparator 650, a non-inverting input for receiving a signal labelled "DIVIDED_CLK", and an output connected to the clock gate input of register 640. Flip-flop 670 is a clocked SR-type flip-flop having a S input for receiving a control signal labelled "STARTATECALPULSE", an R input for receiving a signal labelled "$\overline{STARTATECAL}$", and an output. Flip-flop 680 is a clocked SR-type flip-flop having a S input for receiving a control signal labelled "STARTBTCCALPULSE", an R input for receiving a signal labelled "$\overline{STARTBTCCAL}$", and an output. OR gate 690 has a first input connected to the output of flip-flop 670, a second input connected to the output of flip-flop 680, and an output connected to the control inputs of multiplexers 610 and 630.

Test time controller 600 is a hardware control circuit that determines the flow and asserts various control signals for use in integrated circuit 100. When no calibration is in progress, the output of OR gate 690 is low, causing multiplexer 610 to provide $V_{REF\_}ATE$ continuously as $V_{REF\_}ATE'$. During test time calibration, signal "$\overline{STARTATECAL}$" is low, and signal STARTATECALPULSE is pulsed high, setting flip-flop 670, and causing the value at the second input of multiplexer 610 to be provided as $V_{REF\_}ATE'$. Multiplexer 640 causes the initial value of $V_{REF\_}ATE$ to be captured at the start of calibration in register 640 when the STARTATECALPULSE signal is momentarily high, and thereafter selects the first input. Register 640 thereafter clocks its D input once for each cycle of the DIVIDED CLOCK signal, and register 640 captures the value of $V_{REF\_}ATE$ pulse one. Comparator 650 is a digital comparator that determines whether the number of tiles for which the corresponding comparator provides its DROOP_DETECTED signal at a logic high exceeds half the number of tiles, i.e. N/2. When this sum is greater than N/2, the output of comparator 650 goes high, causing AND gate 660 to de-active the clock gate input of register 640 and completing test time calibration. At the end of calibration, signal $\overline{STARTATECAL}$ goes high, resetting flip-flop 670 and causing the output of OR gate 690 to go low, which in turn causes multiplexer to select $V_{REF}$_ATE to provide as $V_{REF}$_ATE'.

Test time controller 600 allows reduction in test time by avoiding cumbersome and time-consuming VLSI tester instructions or other software intervention. It also works in conjunction with the boot time calibration to hardware controller circuit to implement the techniques described herein. It should be noted, however, that test time controller 600 is just one example of a hardware controller that can implement the procedure of flow chart 500 of FIG. 5, and many other hardware controller circuit designs are also possible.

Figure 7:
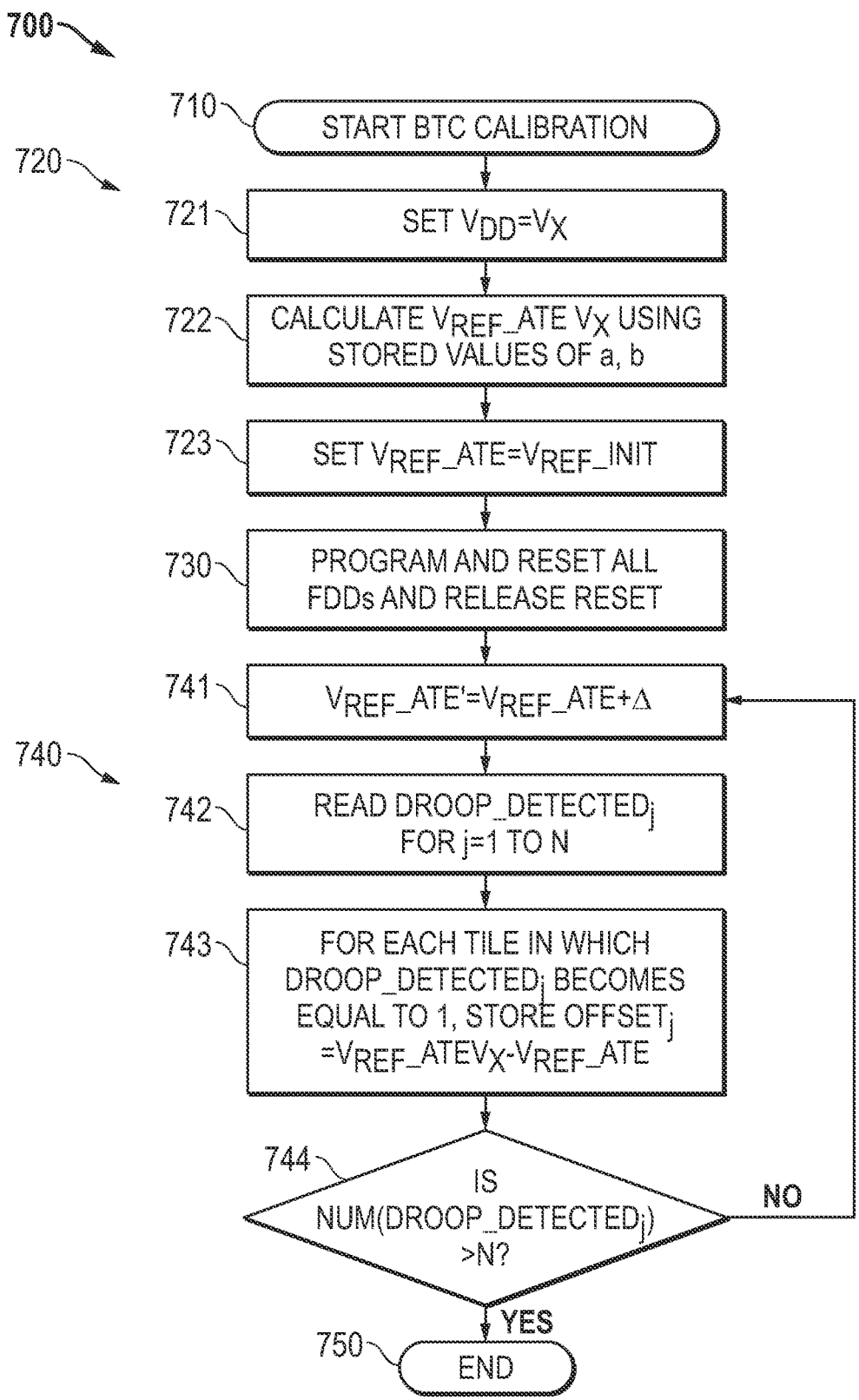
FIG. 7 illustrates a flow chart of a boot time method implemented by the hardware controller of FIG. 1 according to some embodiments.

FIG. 7 illustrates a flow chart 700 of a boot time method implemented by hardware controller 152 of FIG. 1 according to some embodiments. Flow starts at a box 710 and boot time calibration starts in response to, for example, a power-on reset. A sub-flow 720 relates to pre-processing steps and includes action boxes 721, 722, and 723. At action box 721, boot time controller 154 sets the nominal value of $V_{DD}$ to be approximately equal to Vx. At action box 722, it calculates the value of $V_{REF}$_ATE that, on average, causes the tiles to output respective $V_{DD}$_ADJ values to be Vx. At action box 723, boot time controller 154 sets the value of $V_{REF}$_ATE to be equal to an initial value at which all tiles will output their respective $V_{DD}$_ADJ at a value less than Vx.

At an action box 730, system management unit 150 programs and then releases all DLDO regulators and then releases the reset.

A sub-flow 740 varies $V_{REF}$_ATE to determine the individual offsets in each tile, and includes action boxes 741-743 and a decision box 744. At action box 741, $V_{REF}$_ATE' is set to be equal to $V_{REF}$_ATE+$\Delta$, in which A is a unit value such as binary 1. At action box 742, boot time controller 154 reads the value of DROOP_DETECTED$_j$ for j=1 to N. This operation defines a vector indicating the tiles whose comparators have tripped, i.e. those comparators which detect that $V_{REF}$_ATE is less than $V_{DD}$_ADJ$_1$. At action box 743, for each tile in which DROOP_DETECTED becomes 0, the offset for that tile is stored in a corresponding register, which is a digital value equal to $V_{REF}$_ATE$_{VX}$-$V_{REF}$_ATE. At decision box 744, the number of tiles for which DROOP_DETECTEDi has become 0 is compared to the value of N. If the number is not equal to N, then flow returns to action box 741. If the number if equal to N, then flow proceeds to box 750, in which boot time calibration ends.

An exemplary embodiment of a hardware controller suitable for use as boot time controller 154 or FIG. 1 will now be described.

Figure 8:
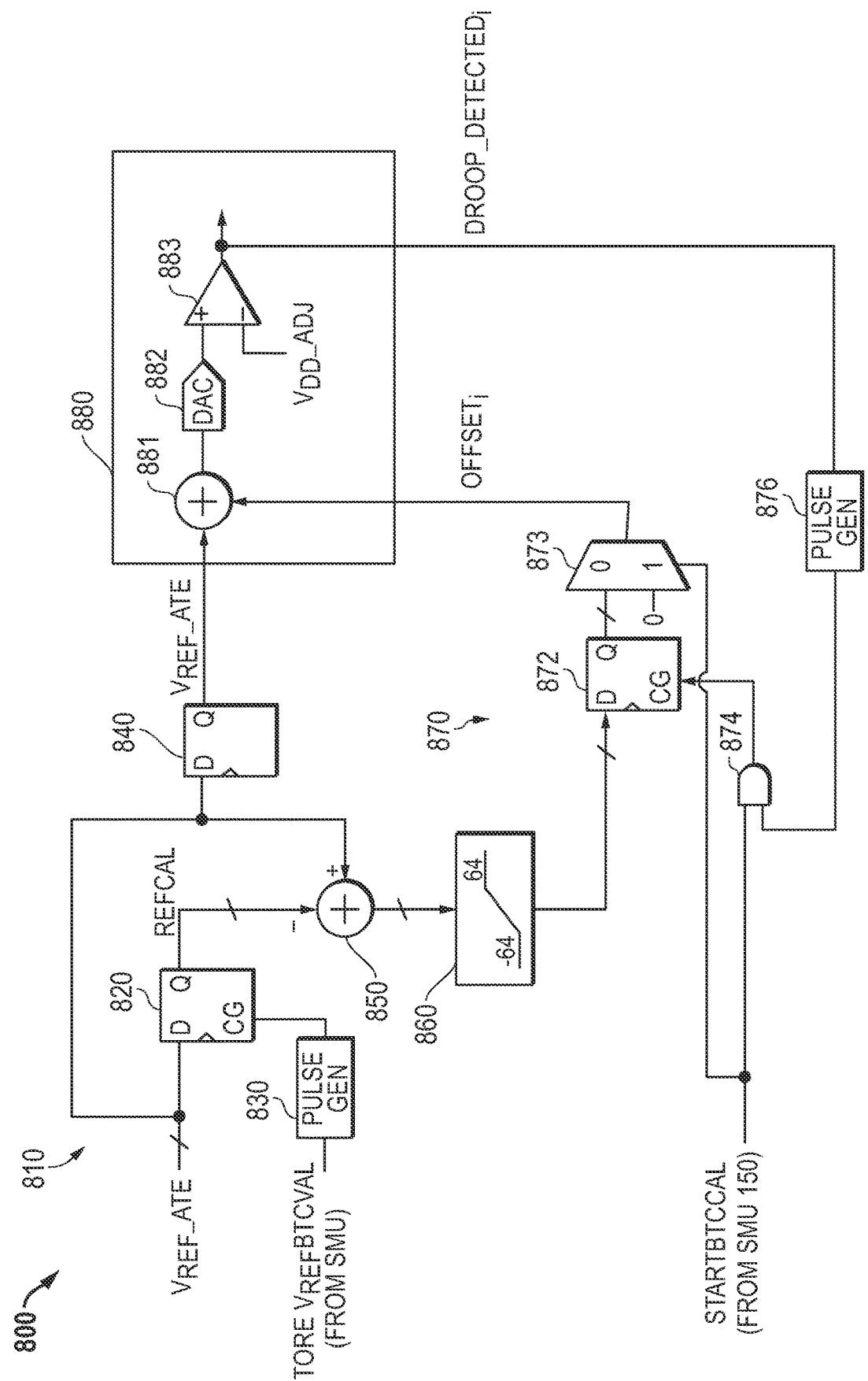
FIG. 8 illustrates in block diagram form a portion of an integrated circuit showing an implementation of a boot time controller that can be used to implement the flow chart of FIG. 7 according to some embodiments.

FIG. 8 illustrates in block diagram form a portion 800 of an integrated circuit showing an implementation of a boot time controller 810 that can be used to implement the flow chart of FIG. 7 according to some embodiments. Boot time controller 810 includes a register 820, a pulse generator 830, a register 840, a summing device 850, a saturator 860, an offset capture logic circuit 870, and a tile 880. Register 820 is a multi-bit register represented pictorially in FIG. 8 as a D-type flip-flop representative of each bit in register 820 and having a D input for receiving $V_{REF}$_ATE, a clock input for receiving a clock signal (not shown), a clock gate input labelled "CG", and a Q output for providing a signal labelled "REFCAL". Pulse generator 830 has an input for receiving a control signal labelled "STOREVREFBTCVAL" from system management unit 150, and an output connected to the CG input of each flip-flop in register 820. Register 840 is a multi-bit register represented pictorially in FIG. 8 as a D-type flip-flop representative of each bit in register 840 and having a D input for receiving $V_{REF}$_ATE, a clock input for receiving a clock signal (not shown), a clock gate input labelled "CG", and a Q output for providing a signal labelled $V_{REF}$_ATE to tile 880. Summing device 850 has a positive input for receiving $V_{REF}$_ATE, a negative input for receiving REFCAL, and an output.

Saturator 860 has an input connected to the output of summing device 850, and an output.

Offset capture logic circuit 870 includes generally a register 872, a multiplexer 873, an AND gate 874, and a pulse generator 876. Register 872 is a multi-bit register represented pictorially in FIG. 8 as a single D-type flip-flop representative of each bit in register 872 and having a D input connected to the output of saturator 860, a clock input for receiving a clock signal (not shown), a clock gate input, and a Q output. AND gate 874 has a first input for receiving for receiving a signal labelled "STARTBTCCAL" from system management unit 150, a second input, and an output. Pulse generator 876 has an input for receiving the DROOP_DETECTED$_j$ signal, and an output connected to the second input of AND gate 874.

Tile 880 includes the circuitry similar to the circuitry shown in tile 120 of FIG. 1, but FIG. 8 only shows circuitry relevant to the operation of boot time controller 810 including a summing device 881, a digital-to-analog converter 882, and a comparator 883. Summing device 881 has a positive input for receiving the $V_{REF}$_ATE signal, a positive input for receiving the OFFSET$_j$ signal, and an output. Digital-to-analog converter 882 has an input connected to the output of summing device 881, and an output. Comparator 883 has a positive input connected to the output of digital-to-analog converter 882, a negative input for receiving a signal labelled "$V_{DD}$_ADT$_j$", and an output for providing the DROOP_DETECTED$_j$ signal.

Boot time controller 810 is a hardware controller circuit that implements boot time controller 154 and parts of the flow of FIG. 7. Register 820, pulse generator 830, register 840, summing device 850, and saturator 860 generate a sequence that can be used by the digital low dropout regulators in all tiles, e.g. tile 880 that receives $V_{REF}$_ATE$_j$ and OFFSET$_j$ and outputs DROOP_DETECTED$_j$ in response.

The value of $V_{REF}$_ATE corresponding to $V_{DD}$=Vx is sent from system management unit 150 to BTC controller 154 and is latched in register 840 and provided to each tile such as tile 880. Inside the tile, the actual threshold voltage for comparator 883 is calculated digitally as described above with respect to FIG. 2 and converted into an analog voltage using digital-to-analog converter 882.

System management unit 150 then sweeps $V_{REF}$_ATE from a minimum value to a maximum value as discussed above with respect to FIG. 7 and toggles the STOR-EVREFBTCVAL signal. Pulse generator 830 generates a pulse to the clock gate input of register 820 to cause it to capture the ideal value of $V_{REF}$_ATE. Saturator 860 ensures that the output of summing device 850 stays between certain limits, e.g. between a negative offset value (e.g., −64) and a positive offset value (e.g., +64).

Next, the STARTBTCCAL signal is sent from system management unit 150, which causes multiplexer to set the initial value of OFFSET$_j$, and to place a 1 on the first input of AND gate 874.

Then system management unit 150 starts incrementing $V_{REF}$_ATE. Through this process, OFFSET$_j$ is being calculated as OFFSET$_j$=$V_{REF}$_ATE−REFCAL. As mentioned above, however, it's not being propagated to the voltage detector (not shown). When the droop detector in a tile activates its output at a certain value $V_{REF}$_ATE, it generates another pulse that captures the current DROOP_DETECTED$_j$ into register 872, which stores the value used during mission mode.

The counter is incremented until all tiles have outputted their respective DROOP_DETECTED signals. STARTBTCCAL is deactivated by system management unit 150, and boot time controller 810 stores the offset in register 872.

Integrated circuit 100 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, various hardware controller designs can be used for test time controller 153 and boot time controller 154. Moreover in other embodiments, hardware controller 152 can store parameters c and d rather than a and b. While the exemplary embodiment described the use of a tiled GPU because of the large number of similar or identical tiles used, the techniques described herein can be applied to other tiled integrated circuits.

Accordingly, it is intended by the appended claims to cover all modifications of the disclosed embodiments that fall within the scope of the disclosed embodiments.

What is claimed is:

1. An integrated circuit comprising:
a plurality of tiles receiving a power supply voltage, each having a corresponding analog circuit and operating in response to a first voltage; and
a hardware controller that receives a voltage identification code and provides said first voltage to each of said plurality of tiles in response thereto, comprising:
a test time controller that determines coefficients of a waveform that describes an average correspondence between said power supply voltage and said first voltage for said plurality of tiles; and
a boot time controller that determines a respective error signal indicating an error between said waveform and a respective actual waveform for each of said plurality of tiles, and provides said respective error signal to said corresponding analog circuit of each of said plurality of tiles,
wherein said corresponding analog circuit of each of said plurality of tiles adjusts said first voltage according to said respective error signal.

2. The integrated circuit of claim 1, wherein said respective analog circuit comprises a comparator.

3. The integrated circuit of claim 1, wherein:
for each of said plurality of tiles, said corresponding analog circuit comprises a voltage regulator having an input for receiving said power supply voltage, a reference input for receiving said first voltage, an offset input for receiving said respective error signal, and an output for providing an adjusted power supply voltage; and
each of said plurality of tiles further comprises a core circuit having a power supply input that receives said adjusted power supply voltage.

4. The integrated circuit of claim 3, wherein said core circuit of each of said plurality of tiles comprises a graphics processing unit core.

5. The integrated circuit of claim 3, wherein said voltage regulator comprises:
a supply adjustment block having an input for receiving said power supply voltage, a control input, and an output for providing said adjusted power supply voltage; and
a digital low dropout controller having a first input for receiving said first voltage, a second input for receiving said adjusted power supply voltage, a control input for receiving said respective error signal, and an output coupled to said control input of said supply adjustment block.

6. The integrated circuit of claim 5, wherein said digital low dropout controller comprises:
a summing device having a first input for receiving said first voltage, a second input for receiving said respective error signal, and an output;
a digital-to-analog converter having an input coupled to said output of said summing device, and an output;
a comparator having a first input coupled to said output of said digital-to-analog converter, a second input for receiving said adjusted power supply voltage, and an output for providing a droop detected signal; and
a charge selection circuit having a first input coupled to said output of said comparator, a second input for receiving a charge control signal, and an output coupled to said control input of said supply adjustment block.

7. The integrated circuit of claim 6, wherein:
said charge selection circuit provides a plurality of selection signals on said output thereof; and
said supply adjustment block comprises a plurality of transistors coupled in parallel that selective pass said power supply voltage to said output thereof in response to respective ones of said plurality of selection signals.

8. The integrated circuit of claim 1, wherein:
said coefficients comprise an intercept and a slope defining a line for said waveform; and
said respective error signal comprises an offset between said waveform and said respective actual waveform for said corresponding analog circuit.

9. An integrated circuit comprising:
a plurality of tiles receiving a power supply voltage, each having a corresponding analog circuit and operating in response to a first voltage; and
a system management unit coupled to each of said plurality of tiles having a hardware controller that:
provides said first voltage to each of said plurality of tiles in response to a voltage identification code;
determines coefficients of a waveform that describes an average correspondence between said power supply voltage and said first voltage for said plurality of tiles;

determines a respective error signal indicating an error between said waveform and a respective actual waveform for each of said plurality of tiles; and provides said respective error signal to said corresponding analog circuit of each of said plurality of tiles, wherein said corresponding analog circuit of each of said plurality of tiles adjusts said first voltage according to said respective error signal.

10. The integrated circuit of claim 9, wherein said hardware controller comprises:

a test time controller that, responsive to a test signal, determines said coefficients and stores said coefficients in corresponding fuses; and a boot time controller that, responsive to a reset signal and said coefficients, determines said respective error signal, and provides said respective error signal to said corresponding analog circuit of each of said plurality of tiles.

11. The integrated circuit of claim 10, wherein said corresponding analog circuit of each of said plurality of tiles comprises a comparator, and for each of first and second values of said power supply voltage, said test time controller:

setts said first voltage to an initial value;

determines a number of comparators of said corresponding analog circuit of each of said plurality of tiles that activates an output thereof, increments said first voltage by a unit amount until said number of comparators of said corresponding analog circuit of each of said plurality of tiles is greater than half of a total number of said plurality of tiles, stores first and second values of said first voltage and first and second values of said power supply voltage when said number of comparators of said corresponding analog circuit of each of said plurality of tiles is greater than half of said total number of said plurality of tiles;

calculates and storing a slope and an intercept of said waveform that describes said average correspondence between said power supply voltage and said first voltage for said plurality of tiles; and determines a value of said first voltage using said waveform in response to said voltage identification code.

12. The integrated circuit of claim 10, wherein said corresponding analog circuit of each of said plurality of tiles comprises a comparator, and for each of first and second values of said power supply voltage, said boot time controller:

sets said power supply voltage to an intermediate value;

calculates a nominal value of said first voltage using said coefficients and said intermediate value;

sets said first voltage to an initial value;

increments said first voltage by a unit amount;

determines which of said plurality of tiles have a comparator that activated its output in response to said incrementing;

associates a current value of said first voltage with said tiles that have a comparator that activated its output and storing said current value;

determines an error voltage as a difference between said current value of said first voltage and said nominal value of said first voltage; and repeats said incrementing, determining, associating, and storing until a number of comparators of said corresponding analog circuit have activated an output thereof.

13. The integrated circuit of claim 9, wherein said respective analog circuit comprises a comparator.

14. The integrated circuit of claim 9, wherein:

for each of said plurality of tiles, said corresponding analog circuit comprises a voltage regulator having an input for receiving said power supply voltage, a reference input for receiving said first voltage, an offset input for receiving said respective error signal, and an output for providing an adjusted power supply voltage; and each of said plurality of tiles further comprises a core circuit having a power supply input that receives said adjusted power supply voltage.

15. The integrated circuit of claim 9, wherein each of said plurality of tiles comprises a graphics processing unit core.

16. The integrated circuit of claim 9, wherein:

said coefficients comprise an intercept and a slope defining a line for said waveform; and said respective error signal comprises an offset between said waveform and said respective actual waveform for said corresponding analog circuit.

17. A method for calibrating an integrated circuit having a plurality of tiles each including an analog circuit and operating using a power supply voltage and a first voltage, comprising:

determining coefficients of a waveform that describes an average correspondence between said power supply voltage and said first voltage for said plurality of tiles using a hardware controller;

determining a respective error signal indicating an error between said waveform and a respective actual waveform for each of said plurality of tiles using said hardware controller;

providing said respective error signal to said analog circuit of each of said plurality of tiles;

setting the power supply voltage in response to a voltage identification code using said hardware controller;

providing the first voltage to each of said plurality of tiles in response to said voltage identification code and said waveform using said hardware controller; and adjusting said first voltage in each of said plurality of tiles according to said respective error signal.

18. The method of claim 17, wherein said analog circuit of each of said plurality of tiles comprises a comparator, and determining said coefficients of said waveform comprises:

setting the first voltage to an initial value;

determining a number of comparators of said analog circuit of said plurality of tiles that activates an output thereof;

incrementing said first voltage by a unit amount until said number of comparators of said analog circuit of each of said plurality of tiles is greater than half of a total number of said plurality of tiles, storing first and second values of said first voltage and first and second values of said power supply voltage when said number of comparators of said analog circuit of each of said plurality of tiles is greater than half of said total number of said plurality of tiles;

calculating and storing a slope and an intercept of said waveform that describes said average correspondence between said power supply voltage and said first voltage for said plurality of tiles; and determining a value of the first voltage using said waveform in response to said voltage identification code.

19. The method of claim 17, wherein said analog circuit of each of said plurality of tiles comprises a comparator, and determining said respective error signal indicating said error between said waveform and said respective actual waveform for each of said plurality of tiles using said hardware controller comprises:
- setting the power supply voltage to an intermediate value;
- calculating a nominal value of the first voltage using said coefficients and said intermediate value;
- setting the first voltage to an initial value;
- incrementing said first voltage by a unit amount;
- determining which of said plurality of tiles have a comparator that activated its output in response to said incrementing;
- associating a current value of said first voltage with said tiles that have a comparator that activated its output and storing said current value;
- determining an error voltage as a difference between said current value of said first voltage and said nominal value of said first voltage; and
- repeating said incrementing, determining, associating, and storing until said comparator of all of the plurality of tiles has activated an output thereof.

20. The method of claim 17, wherein determining said coefficients comprises:
- determining an intercept and a slope of said waveform.

* * * * *